Patented Mar. 3, 1942

2,275,312

UNITED STATES PATENT OFFICE 2,275,312

PROCESS OF NUCLEAR ALKYLATION IN THE PRESENCE OF HYDROFLUORIC ACID

John M. Tinker, Penns Groove, and Viktor Weinmayr, Pitman, N. J., assignors to E. I. du Pont de Nemours & Company, Wilmington, Del., a corporation of Delaware No Drawing. Application June 29, 1938, Serial No. 216,585

14 Claims. (Cl. 260—515)

This invention relates to the preparation of aromatic alkyl compounds formed by replacing one or more nuclear hydrogens of an aromatic body with one or more alkyl radicals; that is, to a reaction known to the art as "nuclear alkylation." More specifically this invention relates to a process for the preparation of isocyclic alkyl compounds formed by replacing one or more of the hydrogen atoms of the isocyclic compound with one or more alkyl radicals in the presence of an acid condensing agent, said condensing agent being hydrofluoric acid. Many of the compounds prepared by this method are new.

The use of strong acids as condensing agents to introduce alkyl radicals into aromatic bodies is known in the art and a number of acids as condensing agents have been used to promote this reaction. Many of the acids used, although applicable to a great number of compounds have serious disadvantages due to the ease with which side reactions occur, such as sulphonation in the presence of sulphuric acid, or oxidation in the presence of perchloric acid. Others are highly specific, like dihydroxyfluoboric acid for the alkylation of phenols. Elevated temperatures promoting side reaction are frequently necessary to achieve nuclear alkylations and in many cases the use of these acids is limited to the use of olefins as the alkylating agents.

One object of this invention is a method for the nuclear alkylation of isocyclic compounds, which method is free from certain disadvantages of known methods and which is applicable to a large number of isocyclic compounds and alkyl compounds. Another object of the invention is the preparation of new alkylated isocyclic compounds. Further objects will appear hereinafter.

According to the present invention, alkyl radicals containing three or more carbon atoms may be introduced into isocyclic compounds, said radicals replacing one or more hydrogen atoms in the isocyclic nucleus, by the condensation of alkylating agents (such as, for example, olefins, ethers, alcohols and esters of alcohols) with the said isocyclic compounds in the presence of hydrofluoric acid as the condensing agent.

The following examples will serve to illustrate the invention but it is to be understood that the invention is not limited thereto. Unless otherwise specified, the parts given are by weight.

EXAMPLE I

*Iso propyl benzene from benzene and propylene*

500 parts by volume of benzene and 375 parts of practically anhydrous hydrofluoric acid are charged into a steel, copper or nickel vessel and cooled to 10–15° C. while 220 parts of about 80% propylene are introduced over a period of 5½ hours through an iron or copper inlet tube. The charge is maintained at 10–15° C. for several hours longer. Because hydrofluoric acid and benzene, especially iso propyl benzene are not miscible, they may be separated by gravity and the hydrofluoric acid layer may be used for a further charge. The reaction mass consisting of unreacted benzene and iso propylated benzene is washed acid free and fractionated. 376 parts of mono-iso propyl benzene, distilling at 151° C. and 117 parts of di-iso propyl benzene distilling from 201–209° C. are obtained.

EXAMPLE II

*1,2,4,5-tetra-isopropyl-benzene from benzene and propylene*

390 parts of benzene and 505 parts of anhydrous hydrofluoric acid are agitated at 15° C. (±3°) in a copper vessel of a capacity of approximately 2,000 parts and 1200 parts of about 80% propylene are introduced over a period of 6 hours. The condensation product is formed as a solid, making agitation difficult towards the end of addition of propylene. The charge is maintained at 20° C. without agitation for 18 hours. The white solid condensation product is discharged onto cold water, dissolved in 1000 parts of benzene and washed free of acid with cold water. Most of the benzene is then distilled off and the residue is dissolved in 3000 parts of boiling alcohol.

940 parts of pure 1,2,4,5-tetra-isopropyl benzene are obtained as large white crystals melting from 117–118° C. A mixture of tri- and tetra isopropyl can be isolated from the mother liquors of the crystallization.

EXAMPLE III

*Mixed cymenes from toluene and propylene*

76 parts of practically anhydrous hydrofluoric acid are added to 552 parts of toluene and the mixture of the two reactants is cooled to 0° C. 132 parts of 100% propylene (used as about 80% propylene) are introduced into this mixture over a period of 6 hours at 0–5° C. and the reaction mass is held in an icepack several hours longer. The reaction mass is then discharged onto cold water and the crude reaction product (670 parts) is separated, washed with cold water until acid free and fractionated. 262 parts of toluene are removed, and 320 parts of mixed cymenes having a boiling range from 171.2 to 191.8° C. are obtained.

EXAMPLE IV
*Tertiary butyl meta xylene from meta xylene and tertiary butyl alcohol*

A mixture of 170 parts of meta xylene and 520 parts of practically anhydrous hydrofluoric acid is cooled to between minus 3 and minus 8° C. and 88.8 parts of tertiary butyl alcohol are added at this temperature over a period of two hours. The condensation mass is held at about 0° C. for 16 hours, then discharged onto ice, the condensation product separated from the dilute hydrofluoric acid and washed with water until acid free. Tertiary butyl meta xylene distilling at 56° C. at a pressure of 44 mm. is obtained with a yield of 97.4% of the amount of tertiary butyl alcohol charged. The excess meta xylene is recovered unchanged and may be used for further condensations.

EXAMPLE V
*Tertiary butyl toluene from toluene and di iso butylene*

A mixture of 400 parts of toluene and 100 parts of hydrofluoric acid is cooled to 3–6° C. and 224 parts of di iso butylene are added over a period of 2 hours. The reaction mass is agitated at 0–5° C. for about 16 hours, then discharged onto ice, the reaction product separated from the dilute hydrofluoric acid, washed acid free and distilled. 230 parts of mono tertiary butyl toluene distilling at 95.5° C. at a pressure of 38 mm. The product was identified by its boiling point at atmospheric pressure and by the melting point of the nitro derivative. 110 parts of poly tertiary butyl toluene distilling from 55 to 80° C. at a pressure of 3 mm. are also obtained.

It is worth noting that di iso butyl toluene does not give an octyl-toluene as the end product but that this octyl-toluene which may be formed initially is split under the influence of hydrofluoric acid into tertiary butyl toluene and butylene which condenses further with toluene. A similar course of the reaction is reported in the art between phenol and di iso butylene in the presence of anhydrous aluminum chloride.

EXAMPLE VI
*Iso propyl naphthalenes from naphthalene and iso propyl alcohol*

64 parts of naphthalene are dissolved in 310 parts of practically anhydrous hydrofluoric acid at 5–12° C. and 75 parts of 88% iso propyl alcohol are added within one hour at this temperature. The charge is agitated at 0–5° C. for about 20 hours, during which time the iso propyl naphthalenes separate from the hydrofluoric acid. The finished condensation mass is poured onto ice (about 1000 parts), and the light colored oil which separates is then dissolved in benzene. The benzene solution is washed with water until free of hydrofluoric acid and then fractionated. The total distillate amounts to 100 parts which comprises 90% of the yield as follows:

19.1% of the yield consists of mono iso propyl naphthalene (B. R. 130–145° C. at 4 mm.)
45.5% of the yield are di iso propyl naphthalenes (B. R. 145–160° C. at 4 mm.)
25.4% of the yield are tri iso propyl naphthalenes (B. R. 170–176° C. at 4 mm.)

10% of the condensation product remains as residue consisting mainly of tetra iso propyl naphthalene.

EXAMPLE VII
*Tetra iso propyl naphthalene from naphthalene and propylene*

128 parts of naphthalene are added to 525 parts of practically anhydrous hydrofluoric acid and 300 parts of approximately 80% propylene are led into this solution at 0–8° C. over a period of 5–6 hours. A white precipitate begins to form in the hydrofluoric acid toward the end of the addition of the propylene. The reaction mass is now allowed to warm slowly to room temperature (20° C.) and is held there for about 20 hours. The excess of hydrofluoric acid is recovered by heating the charge to about 80° C. and condensing the hydrofluoric acid in a brine cooled condenser. The reaction product is then discharged onto water where it disperses to a white precipitate which is filtered and washed acid free. For a further purification, it is digested with cold dilute ammonia, filtered and washed free of ammonia. 290 parts of tetra iso propyl naphthalene equal to a yield of 98% of theory are obtained, melting from 119–125° C. (lit. 127.5° C.). Pure tetra iso propyl naphthalene melting from 128–129° C. is obtained by one crystallization from acetone.

EXAMPLE VIII
*Condensation of naphthalene with a mixture of primary and secondary branched chain alcohols containing 8 to 11 carbon atoms*

324 parts of mixed primary and secondary branched chain alcohols of a boiling range from 160–200° C. are added to a solution of 96 parts of naphthalene in 630 parts of anhydrous hydrofluoric acid during 3 hours while a temperature of 4–8° C. is maintained. The condensation mass is agitated at this temperature for about 24 hours, during which time the condensation product separates from the hydrofluoric acid as an oil. The condensation mass is poured onto ice, the alkyl-naphthalenes are dissolved in benzene, washed acid free, and distilled. 246 parts of alkyl-naphthalenes, distilling from 150 to 300° C. at a pressure of 3 mm., are obtained.

EXAMPLE IX
*Mixed tertiary butyl phenanthrene from phenanthrene and tertiary butyl alcohol*

178 parts of technical 70% phenanthrene are charged into 500 parts of practically anhydrous hydrofluoric acid, and 150 parts of tertiary butyl alcohol are added at 10–15° C. over a period of two hours. The reaction mass is agitated at 10–20° C. for about 20 hours and then poured onto ice. The condensation product is taken up in benzene. The benzene solution is washed acid free and distilled under reduced pressure. A mixture of tertiary butyl phenanthrenes distilling from about 200° C. to 250° C. at 0.3 mm. of Hg and forming a viscous oil at ordinary temperature is obtained.

EXAMPLE X
*Isopropyl anthracene from anthracene and isopropyl ether*

200 parts of isopropyl ether are added to a mixture of 178 parts of 95% anthracene and 600 parts of hydrofluoric acid at 0–5° C. The reaction temperature is raised to 15–20° C. and maintained there for about 20 hours. The condensation mass is poured onto ice, the oily reaction product is dissolved in benzene and washed acid free. 230 parts of isopropylated anthracene distilling from 210° to 250° C. under a pressure of 0.3 mm. of Hg are obtained. The product forms a yellow, very viscous oil and is extremely soluble in organic solvents.

EXAMPLE XI

*Mono and di (1' chloro) tertiary butyl benzenes from benzene and methallylchloride*

A mixture of 250 parts (by volume) of benzene and 150 parts of anhydrous hydrofluoric acid is agitated at 5 to 10° C. and 105.8 parts of methallylchloride (3-chloro-2-methylpropene-1) are added during 30 minutes. The reaction mass is agitated at 0–5° C. for about 20 hours, then drowned onto water. The solvent layer is separated, washed with water and dilute ammonia, and fractionated under vacuum. After the removal of the excess of benzene, one obtains 130 parts of 1' chloro tertiary butyl benzene, distilling at 111° C. at a pressure of 19 mm. and 31 parts of di (1' chloro) tertiary butyl benzene distilling at 140° C. at a pressure of 4 mm. The compounds do not contain fluorine.

EXAMPLE XII

*Alpha beta diphenyl propane from benzene and allyl alcohol*

200 parts of practically anhydrous hydrofluoric acid and 132 parts of benzene are agitated at 4–7° C. while 45.4 parts of allyl alcohol, or an equivalent part of allyl formate, are added over a period of 2 hours. A pleasant aromatic odor is noticeable during the condensation due to the initially formed hydratropa alcohol. The reaction is allowed to proceed for about 16 hours at 0–5° C. An oil which is heavier than water is precipitated when the condensation mass is poured onto ice. 80 parts of pure alpha beta diphenyl propane distilling at 109° C. under a pressure of 3 mm. are obtained. A high boiling, oily material (40 parts) distilling from 109–230° C. at a pressure of 3 mm., showing an intense bluish fluorescence is also isolated. Alpha beta diphenyl propane is also formed when propylene oxide is used in place of allyl alcohol.

EXAMPLE XIII

*Naphthyl stearic acid from naphthalene and oleic acid*

141 parts of oleic acid are added during 30 minutes to a solution of 64 parts of naphthalene in 500 parts of hydrofluoric acid. The reaction mass is agitated at 0–5° C. for about 18 hours, then drowned onto ice where the condensation product separates as an oil. It is dissolved in carbon tetra chloride, washed with cold water and dried with calcium chloride. The carbon tetra chloride is distilled off and a small amount of naphthalene is removed by heating the product to 290° C. at a pressure of 4 mm. The residue (130 parts) forms a dark colored viscous oil which is completely soluble in dilute caustic soda. The product contains no fluorine and is naphthyl stearic acid.

EXAMPLE XIV

*Condensation of toluene and diethyl ether*

1050 parts of practically anhydrous hydrofluoric acid, 115 parts of toluene and 260 parts of diethyl ether are heated in a closed vessel to 100° C. for 4 hours. After cooling to about 20° C., the reaction mass is discharged onto ice, the reaction product separated and distilled. A product distilling from 50 to 218° C. is obtained. It does not contain fluorine.

EXAMPLE XV

*Phenyl ethyl alcohol from benzene and ethylene oxide*

260 parts of ethylene oxide are passed into a mixture of 560 parts of benzene and 60 parts of anhydrous hydrofluoric acid at 6–12° C. over a period of seven hours. Samples of the reaction mass removed during the condensation have the characteristic odor of phenyl ethyl alcohol. This alcohol, however, condenses further so that the end product of the reaction is an oil that distills from 100 to 105° C. at a pressure of 15 mm.

EXAMPLE XVI

*Poly iso propyl tetralin from "tetralin" and propylene*

132 parts of tetralin are added to 450 parts of anhydrous hydrofluoric acid and 280 parts of about 80% propylene are passed into this mixture at 5–10° C. over a period of 4 hours. The reaction mass is held at 0–5° C. for 6 hours and then at about 20° C. for 15 hours. The condensation mass is discharged onto ice, the oily condensation product dissolved in benzene, washed acid free and distilled. Mixed poly iso propyl tetralines distilling from 136–270° C. at a pressure of 4.6 mm. are obtained in good yield.

EXAMPLE XVII

*Di tertiary butyl naphthalene from naphthalene and tertiary butyl alcohol*

128 parts of naphthalene are dissolved in 500 parts of practically anhydrous hydrofluoric acid, and 233 parts of tertiary butyl alcohol are added at 4–8° C. during about 3 hours. The condensation product formed is only poorly soluble in the hydrofluoric acid and precipitates to such an extent that agitation becomes difficult. The reaction mass is kept in an ice bath without agitation for several hours and then discharged onto cold water.

The white precipitate formed is dissolved in benzene and this solution is washed acid free before distillation. 184 parts of di tertiary butyl naphthalene are obtained, distilling from 188–208° C. at a pressure of 6 mm. The yield equals 76.6% of theory. Pure di tertiary butyl naphthalene melting at 143° C. is obtained by crystallizing the crude product from alcohol.

EXAMPLE XVIII

*Di-isopropyl-1-nitro-naphthalene from 1-nitro-naphthalene and isopropyl ether*

214 parts of 1-nitro-naphthalene and 465 parts of practically anhydrous hydrofluoric acid are agitated at 0–5° C. and 102 parts of isopropyl ether are added over a period of 90 minutes. The condensation is allowed to proceed at 5° C. for 6 hours and then at 20° C. for about 12 hours. The condensation mass is drowned onto ice and the condensation product which separates as an oil, is dissolved in carbon tetrachloride. The solvent solution is washed acid free and distilled under reduced pressure. 238 parts of di-isopropyl-1-nitro-naphthalene are obtained, distilling from 155–168° C. at a pressure of 2 mm. Hg. The product is a pale yellow oil when freshly distilled and analyzes 98.2% pure by a titanium chloride titration.

Mono-isopropyl-alpha-nitro-naphthalenes result when a smaller amount of isopropyl ether is used. The di-isopropyl-1-amino-naphthalene which distills from 150–158° C. at a pressure of 0.5 mm. Hg is obtained upon reduction of the di-iso-propyl-1-nitro naphthalene. It is a viscous oil at ordinary temperature and can be diazotized in a normal manner.

Example XIX
*2-4-6 tri iso propyl phenol from phenol and propylene*

142 parts of phenol are dissolved in 490 parts of anhydrous hydrofluoric acid and about 350 parts of 80% propylene are led into this solution at about 10° C. over a period of five hours. The condensation product which becomes insoluble in the hydrofluoric acid is isolated by drowning the condensation mass onto ice and separating the oil from the dilute hydrofluoric acid. The oil is washed with water and dilute caustic and distilled. 275 parts of 2-4-6 tri iso propyl phenol distilling at 161° C. at a pressure of 34 mm. are obtained. This is equal to a yield of 83.4% of theory.

Example XX
*2-4-6 tri iso propyl phenol from phenol and iso propyl alcohol*

820 parts of anhydrous hydrofluoric acid are cooled to 0–5° C. and a solution of 141 parts of phenol in 405 parts of iso propyl alcohol are added during 2½ hours at this temperature. The reaction mass is allowed to warm to room temperature and is maintained there for about 16 hours. The condensation mass is then discharged onto ice and the condensation product is taken up in benzene. The benzene solution is washed acid free and extracted with dilute caustic soda to remove any mono or di iso propyl phenol. 310 parts of 2-4-6 tri iso propyl phenol distilling at 125° C. under a pressure of 7 mm. are obtained. This yield equals 94% of theory.

Example XXI
*Mixed iso propyl phenols from phenol and iso propyl ether in dilute hydrofluoric acid*

94 parts of phenol are dissolved in 240 parts of iso propyl ether and this solution is added within one hour to 1000 parts of 46–48% hydrofluoric acid which is maintained at 65–70° C. The iso propyl phenols become insoluble in the dilute hydrofluoric acid as the condensation progresses. They are isolated by diluting the condensation mass with ice and extracting them with benzene in the usual manner. A mixture of mono and di iso propyl phenols, not containing any tri iso propyl phenol is obtained.

Example XXII
*Mixed cyclo-hexyl-phenols from phenol and cyclohexanol*

141 parts of phenol are dissolved in 500 parts of anhydrous hydrofluoric acid and 150 parts of cyclohexanol are added at 0–5° C. over a period of 2 hours. The reaction mass is maintained at 0–5° C. for about 20 hours and then poured onto ice. The reaction product is dissolved in benzene, washed acid free and distilled. A mixture of ortho- and para-cyclohexyl-phenol is obtained which distills at 180° C. at a pressure of 30 mm. Hg. The crystallizing point of this mixture is about 110° C. Pure para-cyclohexyl phenol can readily be obtained by a crystallization from benzene. A small amount of dicyclohexyl-phenol distilling at 216° C. under a pressure of 12 mm. Hg is also obtained.

Example XXIII
*Mono iso propyl hydroquinone from hydroquinone and iso propyl alcohol*

550 parts of hydroquinone are dissolved in 830 parts of anhydrous hydrofluoric acid and 360 parts of 99% iso propyl alcohol are added at 5–10° C. within two hours. The charge is maintained at 0–5° C. for about 20 hours and then poured onto ice. The reaction product forms a light colored crystalline mass. It is extracted three times with 3000 cc. boiling water to remove any unreacted hydroquinone. The washed product is dissolved in about 2000 parts of ether, separated as well as possible from the water and distilled. 300 parts of mono iso propyl hydroquinone, distilling from 166–170° C. at 6 mm. are thus obtained. This distilled product has a crystallizing point of 128° C. Pure mono iso propyl hydroquinone identified by its melting point (141–142° C.) and a carbon-hydrogen analysis is obtained when the distilled product is crystallized from benzene.

Example XXIV
*Mixed iso propyl meta cresols from meta cresol and propylene*

324 parts of met cresol are dissolved in 550 parts of anhydrous hydrofluoric acid and 16 parts of boric acid anhydride are added. 158 parts of about 80% propylene are introduced into this solution at 3–8° C. over a period of 4 hours and the charge is held at 0–5° C. for 8 hours after the addition of the propylene is finished. The reaction product becomes insoluble in the hydrofluoric acid as the condensation progresses. Frequent tests made during the condensation show that a caustic insoluble product, which would indicate a hydroxy ether formation, is not formed at any time. The finished reaction mass is poured onto ice, the reaction product taken up in carbon tetra chloride, washed acid free and distilled. 408 parts of mixed mono iso propyl meta cresols are obtained, distilling at 102.5° C. at a pressure of 4 mm. Pure thymol is obtained when the mixture of the iso propyl meta cresols is carefully fractionated.

Example XXV
*Monoiso propyl resorcinol from resorcinol and iso propyl alcohol*

275 parts of resorcinol are dissolved in 515 parts of practically anhydrous hydrofluoric acid and 225 parts of iso propyl alcohol are added at minus 2 to minus 5° C. over a period of 2 hours. The charge is held in an ice bath for 22 hours and then poured onto ice. The condensation product, which separates as an oil, is dissolved in benzene, washed with water to remove unreacted resorcinol, and distilled. Mono iso propyl resorcinol distilling from 130° to 140° C. at a pressure of 3 mm. is obtained.

Example XXVI
*Mono benzyl and di benzyl ortho cresol from ortho cresol and di benzyl ether*

162 parts of ortho cresol are dissolved in 290 parts of hydrofluoric acid and 178 parts of di benzyl ether are added during two hours at 5–10° C. The reaction mass is then allowed to warm to about 20° C. and is held at this temperature for several hours. The charge is poured onto ice, the condensation product is dissolved in carbon tetra chloride, the solution is washed acid free and distilled. 180 parts of mono benzyl ortho cresol distilling at about 160° C. under a pressure of 5 mm. and 30 parts of dibenzyl ortho cresol distilling at about 235° C. under the same pressure are obtained.

Example XXVII

*Di iso propyl beta naphthol from beta naphthol and iso propyl alcohol*

Iso propyl alcohol in the amount of 267 parts is added to a mixture of 160 parts of beta naphthol and 500 parts of hydrofluoric acid at 4–9° C. over a period of 4 hours. The reaction mass is agitated at 0–5° C. for 20 hours and then discharged onto ice. The reaction product, which forms an oil, is washed with hot water, taken up in benzene, washed with dilute ammonia and distilled. Di iso propyl beta naphthol in the amount of 260 parts, distilling at 196° C. at a pressure of 2 mm., is obtained. It analyzes 96% pure by its coupling value.

Example XXVIII

*Dodecyl beta naphthol from beta naphthol and dodecyl alcohol*

Dodecyl alcohol in the amount of 205 parts is added to a mixture of 144 parts of beta naphthol and 600 parts of anhydrous hydrofluoric acid at 17–20° C. and the charge is agitated at this temperature for about 20 hours. A heavy oil is precipitated when the reaction mass is poured onto ice. The oil is taken up in benzene, washed with water and dilute ammonia, and distilled. A small amount of beta naphthol and lauryl alcohol are recovered and dodecyl beta naphthol, distilling at 250° C. at a pressure of 1 mm., is obtained.

Example XXIX

*Mixed mono and di iso propyl para amino phenols obtained by alkylating and reducing para nitro phenol*

173.5 parts of para nitro phenol are dissolved in 830 parts of anhydrous hydrofluoric acid, and 255 parts of iso propyl ether are added at about 10° C. within 15 minutes. The charge is heated in a closed vessel to 50–55° C. for 5 hours, and some of the excess of hydrofluoric acid is then distilled off. The reddish condensation product obtained when the reaction mass is poured onto ice is dissolved in 800 parts of thiophene-free benzene, washed acid free and reduced in the presence of a catalyst with hydrogen at 100° C. under a hydrogen pressure of 500 pounds. About 20% of theory of para amino phenol derived from unalkylated para nitro phenol is obtained from the benzene solution by filtration. The remaining benzene solution is distilled and 51 parts of a mixture of mono and di iso propyl para amino phenol, forming a light colored crystalline solid, are obtained, distilling at 150° C. at a pressure of 5 mm. The product is readily soluble in dilute hydrochloric acid, but only sparingly soluble in a dilute sodium hydroxide solution.

Example XXX

*Mono-meta-isopropyl benzoic acid from benzoic acid and isopropyl ether*

183 parts of benzoic acid, 904 parts of anhydrous hydrofluoric acid and 306 parts of isopropyl ether are heated in a closed vessel to 75° C. for 8 hours. The reaction mass is discharged onto ice and the practically colorless oil which separates is washed with water and then refluxed with dilute aqueous caustic for several hours. Some caustic insoluble matter is removed by a benzene extraction. A mixture of unreacted benzoic acid and mono-isopropyl benzoic acid is precipitated from the caustic solution by the addition of hydrochloric acid. The product is extracted with several 1000 parts of boiling water to remove the unreacted benzoic acid. The m-isopropyl benzoic acid, which is very difficultly soluble in water, is dissolved in carbon tetrachloride, washed with water and distilled under reduced pressure.

The mono-isopropyl benzoic acid thus obtained crystallizes at about 20° C. With thionyl chloride it formed readily the mono-isopropyl-benzoyl chloride, boiling at 218° C.

Example XXXI

*Mono and poly iso propyl 2-3 hydroxy naphthoic acids from 2-3 hydroxy naphthoic acid and iso propyl alcohol*

2-3 hydroxy naphthoic acid in the amount of 188 parts is dissolved in 650 parts of anhydrous hydrofluoric acid, and 73 parts of iso propyl alcohol are added at 15–20° C. during one hour. The condensation mass is held at 15–20° C. for 20 hours, during which time the condensation product separates from the hydrofluoric acid as a viscous oil. The reaction mass is poured onto water and the condensation product that separates is washed several times by decantation with hot water. For a further purification, it is dissolved in dilute sodium carbonate and precipitated by running this solution onto cold dilute hydrochloric acid. The light colored precipitate is filtered, washed with ice water and dried at 110° C. Mono iso propyl 2-3 hydroxy naphthoic acid in the amount of 232 parts is obtained, equal to a yield of 92.3% of theory. The crude product melts at about 30–40° C. The product may be further purified by subjecting it to a steam distillation which removes some oily impurity, and digesting the alkyl naphthoic acid with large amounts of boiling water. The product obtained upon drying under vacuum at 100° C. melts from 70–75° C. and is completely soluble in dilute soda ash solution. The compound is identical with that obtainable by an alkylation with sulfuric acid.

Poly iso propyl 2-3 hydroxy naphthoic acids are obtained if a correspondingly larger amount of iso propyl alcohol or iso propyl ether is used.

Example XXXII

*Tri-isopropyl naphthalene-2-sulfonic acid from naphthalene-2-sulfonic acid and isopropyl alcohol*

Crystallized naphthalene-2-sulphonic acid monohydrate in the amount of 113 parts is dissolved in 480 parts of hydrofluoric acid and 90 parts of 99% iso propyl alcohol are added over a period of 30 minutes while the charge is cooled to 0–5° C. The condensation is allowed to proceed at this temperature for 20 hours and the charge is finally warmed to 20° C. for a few hours before it is poured onto 800 parts of ice. The iso propylated naphthalene-2-sulphonic acid separates from the dilute hydrofluoric acid solution as an oil when 750 parts of 96% sulphonic acid are added at 50–80° C. The oily condensation product is separated, dissolved in 500 parts of water and again precipitated at 80° C. through the addition of about 250 parts of sulphuric acid.

The tri iso propyl naphthalene-2-sulphonic acid forms a light colored oil which solidifies at about 40° C. The product is again dissolved in 1000 cc. water. This solution is neutralized with sodium hydroxide and evaporated to dryness. This crude sodium salt is extracted with absolute methyl alcohol at the boil and 153.5 parts of pure tri iso propyl naphthlene-2-sodium sulphonate are obtained.

EXAMPLE XXXIII

*Mono and di iso propyl N-dimethyl para amino phenol from dimethyl para amino phenol and iso propyl ether*

N-dimethyl para amino phenol oxalate in the amount of 364 parts is dissolved in 1175 parts of anhydrous hydrofluoric acid and 214 parts of iso propyl ether are added at 8–10° C. over a period of 2 hours. The temperature is then raised to 20–25° C. and the charge is agitated at this temperature for about 20 hours. Some of the excess of hydrofluoric acid is removed after that time by heating the charge to 50–70° C. for several hours. The hydrofluoric acid solution of the condensation product is then poured onto about 2000 parts of ice and the condensation product is precipitated as an oil by adding aqueous ammonia until the charge is alkaline. The oil is dissolved in about 750 cc. benzene, the benzene solution is washed with water of about 40° C. to remove the excess ammonia, and fractionated. A small amount of a polymerization product derived from iso propyl ether is obtained as a forerun after the benzene is distilled off. Mono iso propyl N-dimethyl para amino phenol in the amount of 150 parts, distilling at 137° C. at a pressure of 3 mm. and 40 parts of di iso propyl N-dimethyl para amino phenol, distilling at 148° C. at a pressure of 3 mm. are obtained. Both compounds are low melting crystalline solids, are completely soluble in dilute hydrochloric acid, and are very insoluble in dilute caustic soda solution or in water.

EXAMPLE XXXIV

*Mixed mono and di iso propyl N-mono methyl para amino phenol from N-mono methyl para amino phenol and iso propyl ether*

N-mono methyl para amino phenol sulfate in the amount of 344 parts is dissolved in 1025 parts of anhydrous hydrofluoric acid, and 214 parts of iso propyl ether are added at 10–20° C. in 15 minutes. This reaction mass is then heated in a closed vessel to 50° C. for 4 hours, after which time the condensation is finished and the excess of hydrofluoric acid may be recovered by heating the charge to about 100° C. until the distillation of hydrofluoric acid has ceased. The condensation mass is then discharged onto cold water and the condensation product is set free as an oil by adding aqueous ammonia until the dilution mass reacts alkaline. The product is dissolved in about 750 cc. benzene, the benzene solution is washed free of ammonia and distilled. A mixture of mono and di iso propyl N-mono methyl para amino phenol in the amount of 228 parts is obtained, distilling at about 137° C. at a pressure of 3 mm. The product forms a low melting crystalline solid which is very insoluble in dilute caustic soda or in water, but readily soluble in dilute hydrochloric acid and in organic solvents.

EXAMPLE XXXV

*Di iso propyl para amino phenol from para amino phenol and iso propyl ether*

Para amino phenol in the amount of 165 parts is dissolved in 1025 parts of anhydrous hydrofluoric acid, and 306 parts of iso propyl ether are added at 10–20° C. within about 30 minutes. The charge is heated in a closed vessel to 75° C. for 5 hours and the excess of hydrofluoric acid is then removed by distilling it at about 100° C. The condensation mass is poured onto ice and the solution obtained is made alkaline with ammonia. The reaction product which separates as a viscous oil is dissolved in benzene, the benzene solution is washed with water and carefully distilled. Di iso propyl para amino phenol, distilling at 120° C. at a pressure of 2 mm. is obtained. The compound forms a difficultly soluble sulphate which crystallizes readily from water. This sulphate is also obtained when the benzene solution is agitated with dilute sulphuric acid.

A wide range of aromatic bodies can be alkylated in the presence of hydrofluoric acid. The preferred compounds are (1) isocyclic hydrocarbons, (isocyclic hydrocarbons as used here and in the claims include unsubstituted isocyclic hydrocarbons and isocyclic hydrocarbons containing non-functioning groups), (2) isocyclic hydroxy compounds (which include not only unsubstituted hydroxy compounds but also isocyclic hydroxy compounds containing nitro, carboxylic or amino groups), and (3) isocyclic organic acids which include isocyclic sulfonic acids and isocyclic carboxylic acids.

Any alkylating agent having an alkyl group of three or more carbon atoms may be used. Alkylating agent as used herein includes unsaturated hydrocarbons and compounds which, under the condition of the reaction will give unsaturated hydrocarbons by the elimination of water, hydrogen sulfide, hydrogen halide, alcohols, acids, mercaptans or amines. The preferred alkylating agents are alcohols, ethers and olefins. The alkyl radicals may be straight-chain or branch-chain or they may be alicyclic. They may also be substituted with halogen or carboxylic acids and may contain an olefinic linkage and a hydroxy group at the same time. Aralkyl radicals may likewise be introduced by the process of the present invention and the terms "alkyl" and "nuclear alkylation" as used in this specification and claims are intended to include all of the above mentioned radicals. Alkyl radicals having from three to eight carbon atoms are preferred. Attempts to introduce methyl groups by the method of this invention were unsuccessful, and ethyl groups could be introduced only in a few cases.

A number of variations of alkylating in the presence of hydrofluoric acid may be employed. Although the preferred method consists of starting with practically anhydrous technical hydrofluoric acid and working at temperatures from 0° to 20° C., other concentrations of hydrofluoric acid and other reaction temperatures may be successfully employed as amply illiustrated by the preceding examples. No particular precautions are necessary to avoid the absorption of moisture by the hydrofluoric acid during the charging of the reactants or during the condensation. Even when the condensation is started with anhydrous hydrofluoric acid it frequently becomes dilute long before the condensation is finished, due to the water that is formed by the reaction. Hydrofluoric acid of as low a concentration as 46% (so-called constant boiling hydrofluoric acid) may be used. Hydrofluoric acid may be used as the solvent but it is not necessary that the starting material be completely soluble in it. Such isocyclic compounds as benzene or xylene are not miscible with hydrofluoric acid but alkylation readily occurs.

The amount of hydrofluoric acid that is used may vary from a fraction to several parts of the reactants used.

The hydrofluoric acid used may readily be recovered by distillation as anhydrous and as constant boiling acid.

While it is most convenient to perform the condensation between 0° C. and the boiling point of anhydrous hydrofluoric acid (21° C.), lower and higher temperatures may successfully be employed. The time necessary to practically complete the condensation varies depending upon the reactants. Frequently, the condensation takes place practically instantly as, for instance, in the formation of isopropyl cresols from cresols and iso propyl alcohol. Here the rate of condensation can be detected by the immediate change of odor of the condensation mass from cresol to thymol. In other cases, a condensation time of several hours may be necessary to complete the reaction as in the alkylation of naphthalene to tetra iso propyl naphthalene. It has been observed that the condensation was usually finished after a reaction time of about 20 hours.

The method of charging the reactants may vary depending upon the nature of the starting materials. The isocyclic compound may be added to the hydrofluoric acid, followed by the alkyl compound, or the isocyclic compound may be dissolved in or mixed with the alkyl compound and then added to the hydrofluoric acid, or hydrofluoric acid may be added to the isocyclic compound dissolved in or mixed with the alkyl compound. Also, the reactants can each be dissolved in hydrofluoric acid and then added to each other. Gaseous olefins may be introduced into a closed reaction vessel containing hydrofluoric acid and the compound to be alkylated under slight pressure.

Additional catalysts appear to be unnecessary for the condensation and do not change the course of the condensation when added. Thus the addition of boric acid anhydride is of no influence upon the course of the reaction as far as has been ascertained.

It is abundantly clear from the above discussion that hydrofluoric acid alone is an effective catalyst for alkylation reactions. The term, "the effective catalyst," used in the claims with reference to hydrofluoric acid is intended to mean that hydrofluoric acid is the sole catalyst necessary to carry out the reaction. This terminology is intended to cover not only alkylation reactions where hydrofluoric acid is the only catalytic agent present, but also alkylation reactions where, in addition to hydrofluoric acid, other catalytic materials are added in amounts such that, in the absence of hydrofluoric acid, they would be ineffective to catalyze the reaction.

The method of isolation of the finished condensation product depends upon the nature of the compounds obtained, whether they are liquids or solids, whether or not they form salts with the hydrofluoric acid, and whether or not they are soluble in the dilute hydrofluoric acid. Frequently the alkylated body is insoluble in the hydrofluoric acid and may be separated from it by decantation. The hydrofluoric acid thus separated may be used for further condensations as recovered or after fortification without intermediate purification.

Although it is frequently reported in the art that olefins and compounds which easily form olefins polymerize rapidly in the presence of hydrofluoric acid, it has been found that such polymerization occurred only in exceptional cases.

The advantages of hydrofluoric acid over known condensing agents are numerous. Probably its chief advantage is the absence of side reactions occurring during the condensations. Of course, sulphonations, oxidations, or reductions do not take place when hydrofluoric acid is used as the alkylating agent. Polymerization of the alkyl compounds is practically nil, in no small extent due to the low temperature at which the condensation can be performed. Migration of the alkyl group of the alkylated bodies formed does not occur. Ether formation was never observed when hydroxy bodies were alkylated. The nuclear alkylated isocyclic hydroxy compounds are the products of the condensation and a high temperature rearrangement of ethers is not required.

Due to the absence of side reactions which are almost unavoidable with other condensing agents, the yields obtainable with hydrofluoric acid are as a rule excellent and the products formed are of great purity. Compounds not at all or only difficultly obtainable by other methods are readily obtained in excellent yields and excellent quality when hydrofluoric acid is used as the condensing agent: to mention but a few, tetra isopropyl naphthalene, tri isopropyl phenol and di isopropyl beta naphthol. The products are, in most cases, obtained pure enough to use them without further purification, by diluting the condensation mass onto water.

Many of the products made according to the present invention are new chemical compounds never before made by any process. Among the novel compounds herein disclosed are mentioned:

Tertiary butyl phenanthrenes (Example IX)
Isopropylated anthracenes (Example X)
Mono and di (1'-chloro) tertiary butyl benzenes (Example XI).
Poly isopropyl tetralin (Example XVI), and
Di-isopropyl-alpha-nitro-naphthalene (Example XVIII)

These new compounds are useful in preparing organic compounds of more complex nature.

The hydrofluoric acid is readily removed from the condensation products. It may be recovered easily and in high yields by distillation even before the condensation products are separated. No reactions occur between the condensation products and the excess of the hydrofluoric acid when the condensation mass is heated to remove all the condensing acid. Most of the hydrofluoric acid used may be recovered as anhydrous acid.

Hydrofluoric acid, even when diluted due to the water formed during the condensations is practically non-corrosive to steel, copper, nickel, or alloys as they are usually found in plant equipment and the reactions may thus be performed in such vessels without difficulty.

Suitable changes may be made in the details of the process and any modifications or variations which conform to the spirit of the invention are intended to be included within the scope of the claims.

We claim:

1. In a process of nuclear alkylation by condensing an isocyclic compound with an alkylating agent having an alkyl group containing at least three carbon atoms, the step which comprises condensing the reactants in the presence of hydrofluoric acid as the effective catalyst.

2. In a process of nuclear alkylation by condensing an isocyclic hydrocarbon with an alkylating agent having an alkyl group containing at least three carbon atoms, the step which comprises condensing the reactants in the presence of hydrofluoric acid as the effective catalyst.

3. In a process of nuclear alkylation by condensing an isocyclic hydroxy compound with an alkylating agent having an alkyl group containing at least three carbon atoms, the step which comprises condensing the reactants in the presence of hydrofluoric acid as the effective catalyst.

4. In a process of nuclear alkylation by condensing an isocyclic organic acid with an alkylating agent having an alkyl group containing at least three carbon atoms, the step which comprises condensing the reactants in the presence of hydrofluoric acid as the effective catalyst.

5. In a process of nuclear alkylation by condensing an isocyclic compound with an alkylating agent having an alkyl group containing at least three carbon atoms, said alkylating agent being selected from a group consisting of alcohols, ethers and olefins, the step which comprises condensing the reactants in the presence of hydrofluoric acid as the effective catalyst.

6. In a process of nuclear alkylation by condensing an isocyclic hydrocarbon with an alkylating agent having an alkyl group containing at least three carbon atoms, said alkylating agent being selected from a group consisting of alcohols, ethers and olefins, the step which comprises condensing the reactants in the presence of hydrofluoric acid as the effective catalyst.

7. In a process of nuclear alkylation by condensing an isocyclic hydroxy compound with an alkylating agent having an alkyl group containing at least three carbon atoms, said alkylating agent being selected from a group consisting of alcohols, ethers and olefins, the step which comprises condensing the reactants in the presence of hydrofluoric acid as the effective catalyst.

8. In a process of nuclear alkylation by condensing an isocyclic organic acid with an alkylating agent having an alkyl group containing at least three carbon atoms, said alkylating agent being selected from a group consisting of alcohols, ethers and olefins, the step which comprises condensing the reactants in the presence of hydrofluoric acid as the effective catalyst.

9. In a process of nuclear alkylation by condensing an isocyclic compound with an alkylating agent having an alkyl group containing three to eight carbon atoms, said alkylating agent being selected from a group consisting of alcohols, ethers and olefins, the step which comprises condensing the reactants in the presence of hydrofluoric acid as the effective catalyst.

10. In a process of nuclear alkylation by condensing an isocyclic hydrocarbon with an alkylating agent having an alkyl group containing three to eight carbon atoms, said alkylating agent being selected from a group consisting of alcohols, ethers and olefins, the step which comprises condensing the reactants in the presence of hydrofluoric acid as the effective catalyst.

11. In a process of nuclear alkylation by condensing an isocyclic hydroxy compound with an alkylating agent having an alkyl group containing three to eight carbon atoms, said alkylating agent being selected from a group consisting of alcohols, ethers and olefins, the step which comprises condensing the reactants in the presence of hydrofluoric acid as the effective catalyst.

12. In a process of nuclear alkylation by condensing an isocyclic organic acid with an alkylating agent having an alkyl group containing three to eight carbon atoms, said alkylating agent being selected from a group consisting of alcohols, ethers and olefins, the step which comprises condensing the reactants in the presence of hydrofluoric acid as the effective catalyst.

13. An alkylation method which comprises contacting hydrogen fluoride, an organic compound containing a replaceable hydrogen atom, and an organic compound containing a replaceable negative group or which in the presence of hydrogen fluoride forms such a group, to effect alkylation of the first of said organic compounds through the medium of hydrogen fluoride as the effective catalyst.

14. In a process of nuclear alkylation by condensing an isocyclic compound with an alkylating agent having an alkyl group containing at least three carbon atoms, the step which comprises condensing the reactants in the presence of anhydrous hydrofluoric acid as the effective catalyst.

JOHN M. TINKER.
VIKTOR WEINMAYR.